United States Patent
Jeong et al.

(10) Patent No.: US 11,406,930 B2
(45) Date of Patent: Aug. 9, 2022

(54) METHOD AND APPARATUS FOR CONTINUOUS REMOVAL OF CARBON DIOXIDE

(71) Applicant: KOREA INSTITUTE OF ENERGY RESEARCH, Daejeon (KR)

(72) Inventors: Soon Kwan Jeong, Sejong (KR); Min Hye Youn, Sejong (KR); Ki Tae Park, Daejeon (KR); Seong-Pil Kang, Daejeon (KR); Wonhee Lee, Daejeon (KR); Hak Joo Kim, Daejeon (KR); Young Eun Kim, Daejeon (KR); Ji Min Kang, Daejeon (KR); Arti Murnandari, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 400 days.

(21) Appl. No.: 16/348,972

(22) PCT Filed: Nov. 8, 2017

(86) PCT No.: PCT/KR2017/012566
§ 371 (c)(1),
(2) Date: May 10, 2019

(87) PCT Pub. No.: WO2018/088783
PCT Pub. Date: May 17, 2018

(65) Prior Publication Data
US 2019/0270047 A1 Sep. 5, 2019

(30) Foreign Application Priority Data

Nov. 10, 2016 (KR) .......................... 10-2016-0149278
Apr. 24, 2017 (KR) .......................... 10-2017-0052159

(51) Int. Cl.
*B01D 53/14* (2006.01)
*B01D 53/79* (2006.01)
(Continued)

(52) U.S. Cl.
CPC ..... *B01D 53/1475* (2013.01); *B01D 53/1425* (2013.01); *B01D 53/1493* (2013.01);
(Continued)

(58) Field of Classification Search
CPC .... B01D 53/1475; B01D 53/79; B01D 53/96; B01D 2251/20405; B01D 2257/504;
(Continued)

(56) References Cited

U.S. PATENT DOCUMENTS

2013/0195747 A1* 8/2013 Kendall .................. C04B 28/10
423/430

FOREIGN PATENT DOCUMENTS

KR  10-2010-0092306 A  8/2010
KR  10-2010-0092317 A  8/2010
(Continued)

OTHER PUBLICATIONS

International Search Report dated Mar. 26, 2018 for PCT/KR2017/012566.

*Primary Examiner* — Anita Nassiri-Motlagh
(74) *Attorney, Agent, or Firm* — Cantor Colburn LLP

(57) ABSTRACT

The present invention relates to a method for continuous removal of carbon dioxide, the method comprising the steps of: a) preparing an aqueous solution containing an amine-based compound and an acidic calcium compound; b) bringing a gas containing carbon dioxide to be treated into contact with the aqueous solution to prepare a calcium carbonate precipitate; and c) recovering the calcium carbonate and then adding a basic calcium compound to the residual aqueous solution, wherein after step c), step b) and step c)

(Continued)

are repeatedly performed. The removal of carbon dioxide by the method of the present invention has advantages of requiring low energy and being capable of mineralizing and removing carbon dioxide at a fast rate without a separate time for induction.

11 Claims, 5 Drawing Sheets

(51) Int. Cl.
  *B01D 53/96* (2006.01)
  *C01F 11/18* (2006.01)
(52) U.S. Cl.
  CPC ............ *B01D 53/79* (2013.01); *B01D 53/96* (2013.01); *C01F 11/181* (2013.01); *B01D 2251/404* (2013.01); *B01D 2251/502* (2013.01); *B01D 2251/606* (2013.01); *B01D 2252/20405* (2013.01); *B01D 2252/20478* (2013.01); *B01D 2252/20484* (2013.01); *B01D 2257/504* (2013.01); *B01D 2258/01* (2013.01); *B01D 2258/0283* (2013.01); *C01P 2002/60* (2013.01); *Y02A 50/20* (2018.01); *Y02C 20/40* (2020.08)

(58) Field of Classification Search
  CPC ........ B01D 2258/01; B01D 2258/0283; C01F 11/181; C01P 202/60
  USPC .......................................................... 423/228
  See application file for complete search history.

(56) References Cited

FOREIGN PATENT DOCUMENTS

| | | |
|---|---|---|
| KR | 101189075 B1 | 10/2012 |
| KR | 10-1447818 B1 | 10/2014 |
| KR | 10-2015-0030980 A | 3/2015 |
| KR | 101550050 B1 | 9/2015 |
| KR | 10-2016-0080950 A | 7/2016 |
| WO | WO-2010093092 A1 * | 8/2010 ......... B01D 53/1475 |

* cited by examiner

METHOD AND APPARATUS FOR CONTINUOUS REMOVAL OF CARBON DIOXIDE

TECHNICAL FIELD

The present invention relates to a method and an apparatus for continuous removal of carbon dioxide by mineralizing carbon dioxide.

BACKGROUND ART

Recently, due to various problems caused by global warming, there has been an increasing interest in a method for reducing greenhouse gas emissions causing global warming, and accordingly, studies regarding this are actively being conducted. One of the representative greenhouse gases, carbon dioxide, is a material that has the greatest influence on global warming since a large amount of carbon dioxide is contained in the atmosphere even though carbon dioxide has a low global warming index, which is a measure of global warming compared to an emission amount. Accordingly, various studies for reducing emission of carbon dioxide have been conducted.

In reality, carbon dioxide emission reduction technologies that are available to actual industries or internal combustion engines are called carbon capture and storage (CCS) technologies. The capturing technology for reducing emission of carbon dioxide is classified into a pre-combustion capturing technology, a pure oxygen combustion technique, and a post-combustion capturing technology. However, the most easily applicable technology to the existing facilities may be the post-combustion capturing technology. This capturing technology includes a method for using a compound such as an amine-based absorbent, a method for using a separation membrane, or the like. However, it is general to use an amine-based compound capable of capturing carbon dioxide at a high concentration. However, when it is attempted to capture carbon dioxide in the amine-based compound, and to recover the captured carbon dioxide, there is a problem in that high energy is required.

The carbon dioxide captured above may be treated by disposal in the ocean. However, various studies have been conducted on a method for preparing a carbonate mineral such as calcium carbonate, magnesium carbonate, or the like, as a more stable method for utilizing captured carbon dioxide.

However, this carbon capture and storage (CCS) technology has a problem in that a capture step and a storage step are separated, which makes the process complicated. Korean Patent No. 10-1189075 also discloses a method for separating a carbon dioxide absorbent and then precipitating and separating the carbon dioxide absorbent as crystals. However, in this case, there are problems in that absorption and precipitation steps of carbon dioxide are separated, which makes the process complicated, and it is difficult to remove a large amount of carbon dioxide within a short time.

Further, Korean Patent No. 10-1550050 discloses a method for capturing carbon dioxide at a high concentration using an amine-based compound and then bringing carbon dioxide into contact with an organic calcium salt to recover carbon dioxide as calcium carbonate. However, even in this case, there is a problem in that an induction time for preparing a carbon dioxide saturated aqueous solution is long.

DISCLOSURE

Technical Problem

An object of the present invention is to provide a method for removal of carbon dioxide by mineralizing carbon dioxide by low energy.

Another object of the present invention is to provide a method for removal of carbon dioxide capable of performing mineralization immediately after capturing carbon dioxide by a simple process without requiring a separate time for induction.

Still another object of the present invention is to provide a method for removal of carbon dioxide which has high process efficiency and is capable of being continuously treated.

Still another object of the present invention is to provide a method for removal of carbon dioxide capable of mineralizing and separating carbon dioxide at a fast rate.

Technical Solution

In one general aspect, a method for continuous removal of carbon dioxide includes:

a) preparing an aqueous solution containing an amine-based compound and an acidic calcium compound;

b) bringing a gas containing carbon dioxide to be treated into contact with the aqueous solution to prepare a calcium carbonate precipitate; and c) recovering the calcium carbonate and then adding a basic calcium compound to the residual aqueous solution, wherein after step c), step b) and step c) are repeatedly performed.

The acidic calcium compound may include chlorine atoms.

The basic calcium compound may include an oxygen atom or a hydroxyl group.

The gas containing carbon dioxide to be treated may be an exhaust gas stream.

Step b) may be performed at room temperature.

Carbon dioxide in step b) may be dissolved in the aqueous solution in an amount of 0.7 mol or more per 1 mol of the amine-based compound.

In step b), the gas to be treated may be brought into contact with the aqueous solution in the form of microbubbles.

After step b), the amine-based compound may be regenerated at a yield of 95% or more.

A regeneration rate of the amine-based compound may be 0.3 mmol·mol$^{-1}$·sec$^{-1}$ or more.

The amine-based compound may be one or more selected from the group consisting of a primary amine, a secondary amine, a tertiary amine, and a sterically hindered amine-based compound.

The calcium carbonate recovered in step c) may have an average crystal size of 10 to 50 nm.

In another general aspect, an apparatus for continuous removal of carbon dioxide includes:

a reactor including an amine-based compound;

a basic calcium compound injection unit injecting a basic calcium compound into the reactor;

a calcium carbonate recovery unit; and a target gas injection unit positioned at one side of the reactor and injecting a gas containing carbon dioxide to be treated.

Advantageous Effects

The method for removal of carbon dioxide according to the present invention does not require additional energy for recovering captured carbon dioxide by including an acidic calcium compound, and does not require an induction time for preparing a carbon dioxide saturated solution since calcium carbonate is prepared immediately after capturing carbon dioxide.

The method for removal of carbon dioxide according to the present invention is advantageous in that continuous treatment of carbon dioxide is capable of being performed by a simple process.

The method for removal of carbon dioxide according to the present invention is advantageous in that carbon dioxide is capable of being mineralized and separated at a fast rate.

BEST MODE

Figure 1:
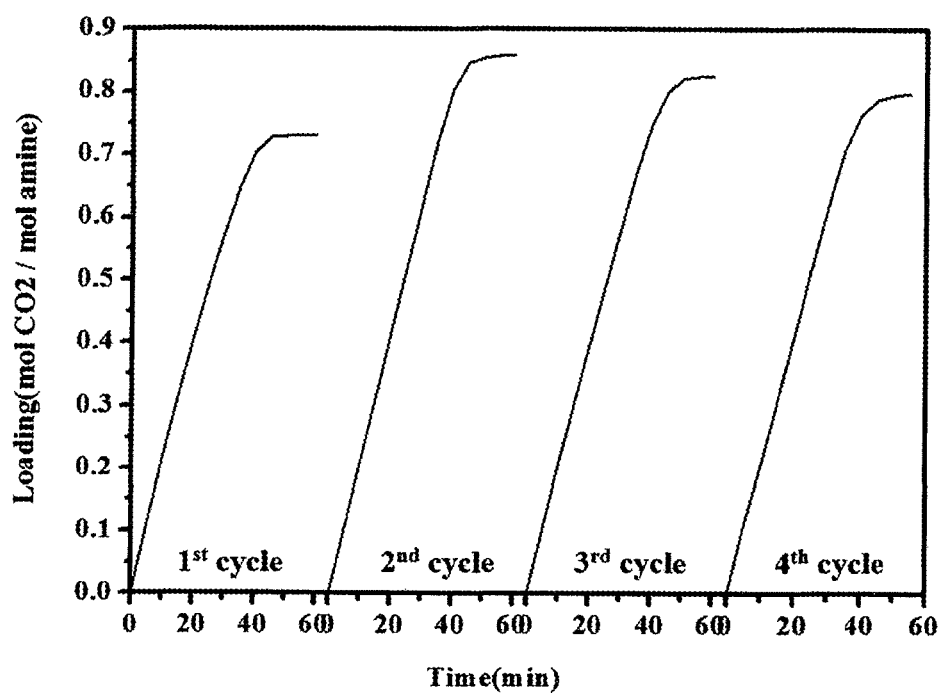
FIG. 1 shows a loading amount of carbon dioxide relative to an amine-based compound for each cycle in a method for continuous removal of carbon dioxide according to an embodiment of the present invention.

Hereinafter, a method and an apparatus for continuous removal of carbon dioxide according to the present invention will be described in detail with reference to the accompanying drawings. The following drawings to be described below are provided by way of example so that the idea of the present invention can be sufficiently transferred to those skilled in the art to which the present invention pertains. Therefore, the present invention is not limited to the following drawings, but may be embodied in other forms, and the following drawings may be exaggerated in order to clarify the spirit of the present invention. Unless otherwise defined, the technical terms and scientific terms used herein have meanings generally understood by those skilled in the art to which the present invention pertains. Known functions and constitutions that may obscure the gist of the present invention with unnecessary detail will be omitted.

Conventionally, in the carbon dioxide capture and storage technology (CCS) for reducing emission of carbon dioxide, a large number of amine-based compounds capable of performing capturing carbon dioxide at a high concentration have been conventionally used as a method for capturing carbon dioxide. However, the amine-based compound has a problem in that high energy is required when recovering the captured carbon dioxide. In order to solve the problem, a method for capturing carbon dioxide at a high concentration in the amine-based compound and then bringing the amine-based compound into contact with other compounds to recover a mineral such as calcium carbonate, magnesium carbonate, or the like, has been proposed. However, in this case, there is a problem in that a long induction time for preparing a carbon dioxide saturated aqueous solution is required.

Thus, the present applicant has studied for a long time a method for removal of carbon dioxide capable of rapidly removing carbon dioxide continuously discharged from industries, an internal combustion engine, or the like, without requiring the above-described induction time while capturing carbon dioxide using an amine-based compound.

As a result of the study, the present applicant found that when the amine-based compound and the acidic calcium compound were mixed and brought into contact with a gas containing carbon dioxide to be treated, and then a basic calcium compound was used as a source of calcium ions in the subsequent process, it was possible to continuously and rapidly remove carbon dioxide without requiring the induction time for preparing a carbon dioxide saturated aqueous solution, and completed the present invention.

Thus, the present invention relates to a method for continuous removal of carbon dioxide, the method including:

a) preparing an aqueous solution containing an amine-based compound and an acidic calcium compound;

b) bringing a gas containing carbon dioxide to be treated into contact with the aqueous solution to prepare a calcium carbonate precipitate; and c) recovering the calcium carbonate and then adding a basic calcium compound to the residual aqueous solution, wherein after step c), step b) and step c) are repeatedly performed.

When carbon dioxide is removed by the method of the present invention, there are advantages in that it is possible to remove carbon dioxide using low energy, and further, there is no need for induction time for preparing a separate solution in which carbon dioxide is saturated.

Specifically, the method for continuous removal of carbon dioxide according to the present invention is a method for preparing a calcium carbonate precipitate by capturing carbon dioxide and reacting with a calcium-based compound, and has an advantage in that a separate carbon dioxide recovery process is not required by removing carbon dioxide. Further, carbon dioxide contained in the gas to be treated does not require the induction time separately since carbon dioxide forms a calcium carbonate precipitate as soon as carbon dioxide is dissolved in the aqueous solution. Thus, the method is more easily applicable to practical industrial facilities or internal combustion engines. In addition, in the method for continuous removal of carbon dioxide according to the present invention, capture and mineralization of carbon dioxide are continuously performed in one reactor, and thus there are advantages in that the capture and recovery of carbon dioxide are performed in one reactor unlike the prior art in which the capture and recovery of carbon dioxide are performed in separate reactors.

The method for continuous removal of carbon dioxide according to the present invention includes:

a) preparing an aqueous solution containing an amine-based compound and an acidic calcium compound.

Here, the acidic calcium compound is an acidic calcium salt compound. Specifically, the acidic calcium compound according to an embodiment of the present invention may include chlorine. For example, the acidic calcium compound containing chlorine may be $CaCl_2$, but the present invention is not limited thereto. However, in the method for continuous removal of carbon dioxide according to an embodiment of the present invention, when $CaCl_2$ is used as the acidic calcium compound, chlorine ions ($Cl^-$) are supplied to the aqueous solution, and the chlorine ions dissolved in the aqueous solution promotes loading of carbon dioxide contained in the gas to be treated and promotes dissolution of the basic calcium compound to be mixed in step c), thus resulting in removing carbon dioxide by mineralization at a fast rate. Specifically, when chlorine ions are contained in the aqueous solution, carbon dioxide may be loaded on the aqueous solution at a rate of 2 times or more, up to 7 times as fast as a case where chlorine ions are not contained, and as a result, carbon dioxide may be mineralized and removed at a fast rate.

Further, the amine-based compound and the acidic calcium compound may be mixed in step a) at a molar ratio of 1:0.1 to 2, and specifically 1:0.5 to 1.5. When the molar ratio of the amine-based compound and the acidic calcium compound mixed in the aqueous solution of step a) is within the above-described range, carbon dioxide may be loaded on the aqueous solution in an amount of 0.8 mol or more per 1 mol of the amine-based compound based on a finally loaded amount, while simultaneously preparing a large amount of calcium carbonate. As a result, there is an advantage that a large amount of carbon dioxide may be mineralized and removed relative to the amount of the aqueous solution, a concentration of the amine-based compound, or a size of the reactor. Further, within the above-described range, the loading of carbon dioxide may also be promoted, and thus carbon dioxide may be mineralized and removed at a faster rate.

Here, the amine-based compound may be one or more selected from the group consisting of a primary amine, a secondary amine, a tertiary amine, and a sterically hindered amine-based compound. Specifically, the amine-based compound may be a compound represented by Chemical Formula 1 below:

[Chemical Formula 1]

in Chemical Formula 1, $R^1$, $R^2$, and $R^3$ are independently —H, or C1-10 linear or branched chain alkyl unsubstituted or substituted with one or more —OH.

Preferably, the amine-based compound according to the present invention may be one or more selected from 2-amino-2-methyl-1-propanol (AMP), monoethanolamine (MEA), methyl diethanolamine (MDEA), diethanolamine (DEA), and 2-piperidineethanol (PE). When the above-described materials are used as the amine-based compound, the amine-based compounds to be described below may be regenerated at a fast rate, thereby promoting removal of carbon dioxide through mineralization.

In addition, the concentration of the amine-based compound in the aqueous solution of step a) may vary depending on the concentration of carbon dioxide contained in the gas to be treated, the size of the reactor, and the like. As a specific and non-limiting example, the concentration of the amine-based compound may be 5 to 50 wt %, and more specifically 10 to 30 wt %, but the present invention is not limited thereto.

The method for continuous removal of carbon dioxide according to the present invention includes:

b) bringing a gas containing carbon dioxide to be treated into contact with the aqueous solution to prepare a calcium carbonate precipitate. In step b), carbon dioxide contained in the gas to be treated may react with calcium dissolved in the aqueous solution, and may precipitate in the form of calcium carbonate ($CaCO_3$) to be removed.

Here, the gas containing carbon dioxide to be treated may be a gas containing carbon dioxide, and specifically, the gas to be treated may be an exhaust gas stream.

Further, the amount of carbon dioxide dissolved in the aqueous solution after step b) may vary depending on the concentration of the amine-based compound, the concentration of the acidic calcium compound, the size of the reactor, and the like. Specifically, the molar ratio of the amine-based compound and carbon dioxide dissolved in the aqueous solution may be 1:0.7 or more, and specifically 1:0.7 to 0.9. When the molar ratio of dissolved carbon dioxide relative to 1 mol of amine-based compound is 0.7 mol or more, there is an advantage that a removal efficiency of carbon dioxide may be further improved.

Further, the gas to be treated in step b) may be brought into contact with the aqueous solution in the form of micro-bubbles, wherein the micro-bubbles may have a size of 5 to 50 μm, and specifically 5 to 30 μm, based on a pore size of a sparger that disperses the bubbles on the aqueous solution, but the present invention is not limited thereto.

In addition, in the method for continuous removal of carbon dioxide according to an embodiment of the present invention, the amine-based compound may be regenerated at a yield of 95% or more after step b), and more preferably through step c). Specifically, the amine-based compound mixed in the aqueous solution in step a) is mixed with the acidic calcium compound to be combined with hydrogen ions in a process of mineralizing carbon dioxide, thereby forming ammonium ions. Thereafter, when the basic calcium compound is added, hydrogen ions are released from ammonium ions, and the amine-based compound is returned in the added state in step a). Here, a regeneration yield of the amine-based compound according to an embodiment of the present invention may be 95% or more, and specifically 97% or more. By this regeneration of the amine-based compound, it is possible to perform the continuous removal process of carbon dioxide, and it is possible to perform the continuous process for a long period of time by preventing deterioration of a removal efficiency of carbon dioxide in the long term.

In addition, the regeneration rate of amine-based compound to be regenerated after step b) may reach 0.3 mmol·mol$^{-1}$·sec$^{-1}$ and up to 0.7 mmol·mol$^{-1}$·sec$^{-1}$. This regeneration rate is 1.5 times or more and up to 9 times more than that of a heat treatment method for regenerating the amine-based compound when the same acidic calcium compound as the present invention is not contained in the capture of carbon dioxide using the amine-based compound according to the conventional method. As a result, since the present invention does not require a separate heat treatment step for regenerating the amine-based compound which is performed in the conventional method, it is possible to perform continuous treatment, and the amine-based compound is regenerated at a fast rate, and thus there is an advantage in that carbon dioxide is capable of being removed at a remarkably fast rate as compared to the related art.

Further, step b) according to an embodiment of the present invention may be performed at room temperature, and specifically at 15 to 45° C., and steps a) and c) may also be performed at room temperature. That is, since the method for continuous removal of carbon dioxide according to an embodiment of the present invention does not require a separate step for recovering carbon dioxide from the amine-based compound as described above, the method may be performed at room temperature, and thus there is an advantage in that treatment cost of carbon dioxide may be remarkably reduced. In addition, in the conventional method for removal of carbon dioxide, deterioration of the treatment efficiency of carbon dioxide, which may be caused by lowering solubility of the gas due to a high temperature, is capable of being prevented to remove carbon dioxide more efficiently. Specifically, when carbon dioxide contained in the gas to be treated is removed by the method for continuous removal of carbon dioxide according to an embodiment of the present invention, it is possible to remove carbon dioxide contained in the gas to be treated at a high efficiency of 95% or more, and more specifically 97% or more.

Here, calcium carbonate particles precipitated in step b) may have an average crystal size of 10 to 50 nm, and specifically may form calcite crystals. Further, an average diameter of the calcium carbonate particles precipitated according to an embodiment of the present invention may be uniform as 500 nm or less, but the present invention is not limited thereto.

The method for continuous removal of carbon dioxide according to the present invention includes:

c) recovering the calcium carbonate and then adding a basic calcium compound to the residual aqueous solution. As described above, by repeatedly adding the basic calcium compound, which is not an acidic calcium compound in step c), it is possible not only to continuously supply calcium ions to the aqueous solution, but also to prevent acidification of the aqueous solution due to continuous addition of the acidic calcium compound and lowering of the solubility of the carbon dioxide due to the acidification. Further, when the acidic calcium compound includes chlorine atoms as described above, a concentration of the chloride ion contained in the aqueous solution after step a) in the method for continuous removal of carbon dioxide according to an embodiment of the present invention may be kept constant throughout the process. The constantly kept concentration of chlorine ions not only prevents the lowering of the solubility of carbon dioxide, but also promotes dissolution of the basic calcium compound added in step c). As a result, it is advantageous in that carbon dioxide is capable of being removed without lowering the removal efficiency of carbon dioxide throughout the process.

The basic calcium compound according to the present invention is a calcium salt compound having basicity. Specifically, the basic calcium compound according to an embodiment of the present invention may include an oxygen atom or a hydroxyl group. For example, the basic calcium compound may be $Ca(OH)_2$, CaO, or the like, but the present invention is not limited thereto.

Further, the basic calcium compound added in step c) may be in a particle phase or an aqueous solution phase dissolved in water, and preferably may be in the aqueous solution phase for rapid mixing. However, the present invention is not limited thereto. In addition, an amount of the basic calcium compound added in step c) may vary depending on an amount of precipitated calcium carbonate and an amount of the amine-based compound or the acidic calcium compound mixed in step a). As a specific and non-limiting example, regarding the amount of the basic calcium compound to be added, a molar ratio of the amine-based compound and the basic calcium compound added in step a) may be 1:0.1 to 2, and specifically 1:0.5 to 1.5, but the present invention is not limited thereto.

The present invention also provides an apparatus for continuous removal of carbon dioxide.

The apparatus for continuous removal of carbon dioxide according to the present invention includes:

a reactor including an amine-based compound;

a basic calcium compound injection unit injecting a basic calcium compound into the reactor;

a calcium carbonate recovery unit; and a target gas injection unit positioned at a lower end of the reactor and injecting a gas containing carbon dioxide to be treated.

When carbon dioxide is removed using the apparatus according to the present invention, there are advantages in that not only carbon dioxide may be continuously treated, but also carbon dioxide may be mineralized at a fast rate.

Specifically, the reactor may further include an acidic calcium compound as well as an amine-based compound. When the reactor further includes the acidic calcium compound, dissolution of the basic calcium compound to be added thereafter may be promoted, thereby promoting the formation of calcium carbonate by a reaction between the dissolved carbon dioxide and the calcium ions to remove carbon dioxide at a faster rate.

Here, the amine-based compound contained in the reactor may be in the aqueous solution phase. In the case of an aqueous solution form, a concentration of the amine-based compound may be 5 to 50 wt %, and more specifically 10 to 30 wt %, but the present invention is not limited thereto.

Further, when the reactor according to an embodiment of the present invention further includes an acidic calcium compound, a molar ratio of the amine-based compound and the acidic calcium compound may be 1:0.1 to 2, and specifically 1:0.5 to 1.5. When the molar ratio of the amine-based compound and the acidic calcium compound is within the above-described range, the total amount of carbon dioxide to be treated may be remarkably improved by mineralizing 0.8 mol or more of carbon dioxide relative to 1 mol of the amine-based compound.

The apparatus for continuous removal of carbon dioxide according to the present invention includes the basic calcium compound injection unit capable of injecting the basic calcium compound. Here, the basic calcium compound to be added may be in a solid phase or an aqueous solution phase, but the present invention is not limited thereto.

The apparatus for continuous removal of carbon dioxide according to the present invention further includes a calcium carbonate recovery unit that recovers a calcium carbonate precipitate prepared by the reaction of carbon dioxide and the calcium compound. The calcium carbonate recovery unit is not limited as long as the unit includes an apparatus capable of recovering the calcium carbonate precipitate. Further, the recovery unit may be positioned at a lower end of the reactor or at a lower side of the reactor.

The apparatus for continuous removal of carbon dioxide according to the present invention includes a target gas injection unit that injects a gas containing carbon dioxide to be treated in the reactor. The gas to be treated is not limited as long as the gas is a gas phase containing carbon dioxide. However, as a specific and non-limiting example, the gas to be treated may be a gas containing 1 vol % [[1%]] or more of carbon dioxide, and more specifically, 1 to 80 vol % of carbon dioxide, but the present invention is not limited thereto.

In the apparatus for continuous removal of carbon dioxide according to an embodiment of the present invention, the target gas injection unit may further include a sparger. Further, in order to promote contact between the gas to be treated and the amine-based compound in the reactor, the sparger may have a pore size of 5 to 50 μm, and more specifically 5 to 30 μm, but the present invention is not limited thereto.

Further, the apparatus for continuous removal of carbon dioxide according to an embodiment of the present invention may further include a stirring device for uniform mixing in the reactor.

Hereinafter, the present invention is described in more detail with reference to the following Examples. The following Examples are provided only for the understanding of the invention, and the present invention is not limited to the following Examples.

Example 1

Figure 2:
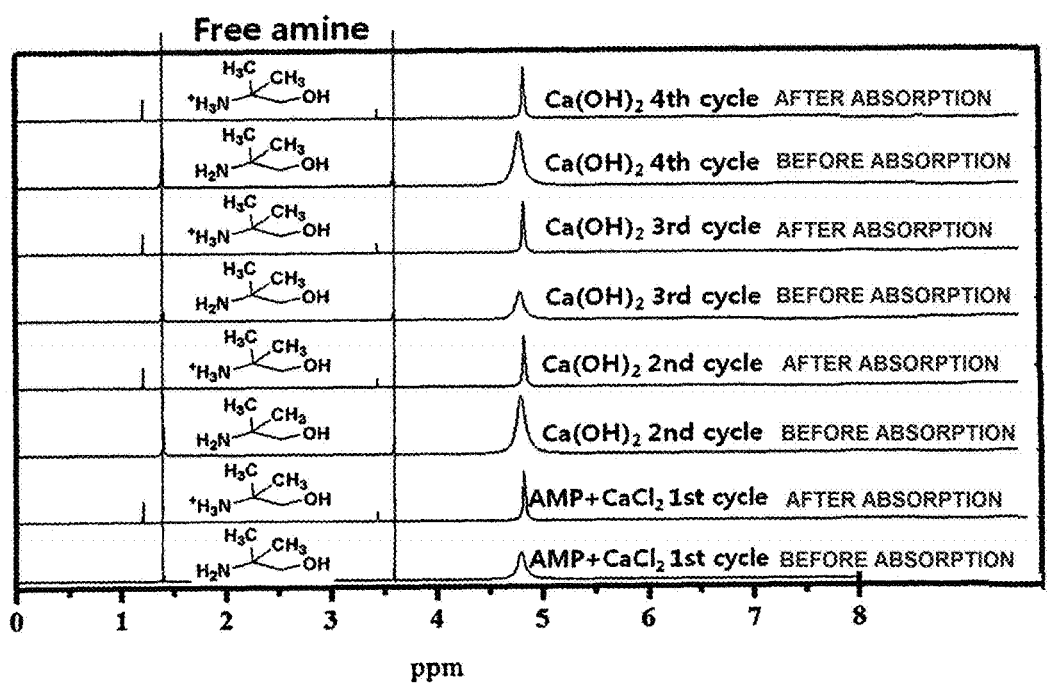
FIG. 2 shows the form of the amine-based compound in an aqueous solution phase for each cycle in the method for continuous removal of carbon dioxide according to an embodiment of the present invention.
Figure 3:
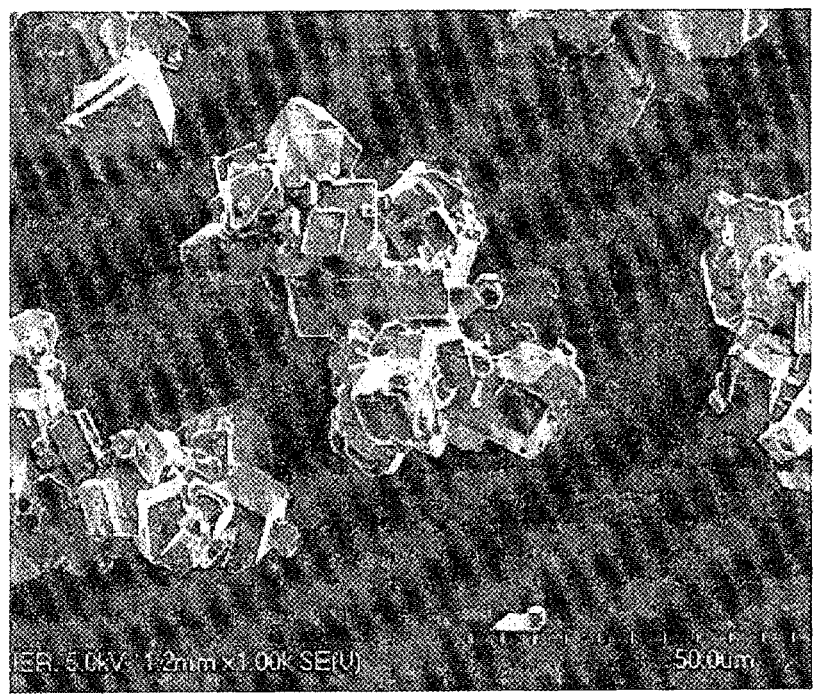
FIG. 3 shows a scanning electron microscope (SEM) image of calcium carbonate particles.

Confirmation of Continuous Mineralization of Carbon Dioxide and Regeneration of Amine-Based Compound in Presence of Acidic Calcium Compound To a 1.6 M 2-amino-2-methyl-1-propanol (hereinafter, referred to as AMP) solution, $CaCl_2$ in the same molar amount as that of the AMP was added at 40° C. to prepare an aqueous solution. The prepared aqueous solution was filled in a reactor having a volume of 0.5 $dm^3$, and a height/diameter ratio of 2, and a length/diameter ratio of 1. While the reactor was stirred at a speed of 450 rpm using a magnetic stirrer, a gas to be treated was injected at 0.5 L per minute using a sparger having a pore size of 20 μm. After 60 minutes, $Ca(OH)_2$ having the same molar amount as that of $CaCl_2$ was repeatedly added three times at an interval of 60 minutes so that the calcium compound was added for a total of four cycles (hereinafter, one cycle referred as being from the addition of the calcium compound to the next addition). The number of moles of $CO_2$ loaded on the aqueous solution relative to the number of moles of AMP added per time zone was calculated and shown in FIG. 1. During the reaction, the aqueous solution was stirred at 450 rpm using a magnetic stirrer. In addition, samples before and after each cycle were taken, and a form of AMP was confirmed by nuclear magnetic resonance (NMR), and results thereof are shown in FIG. 2. In addition, the calcium carbonate particles precipitated during the reaction were separated, washed with acetone, and dried in a vacuum oven at 40° C. and 0.5 Torr for 30 minutes to recover calcium carbonate, and a shape and a particle size of the crystals were confirmed using a scanning electron microscope (SEM), and results thereof are shown in FIG. 3.

Here, the gas to be treated is a mixed gas in which 30 vol % of $CO_2$ and 70 vol % of $N_2$ are mixed.

Comparative Example 1

Figure 4:
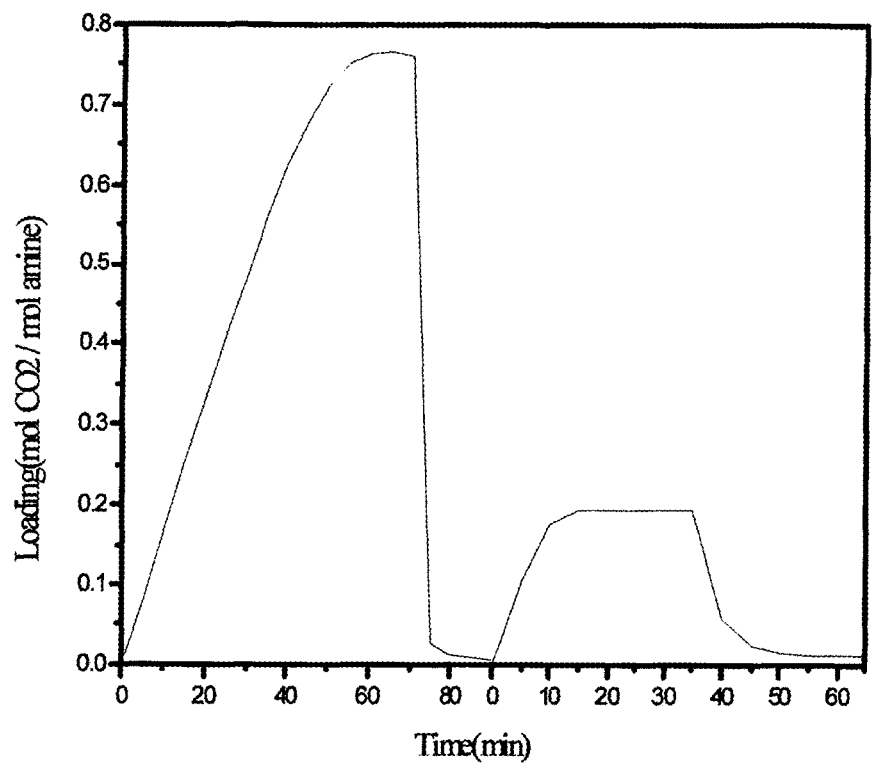
FIG. 4 shows a loading amount of carbon dioxide for each cycle according to Comparative Example of the present invention.

Comparative Example 1 was performed in the same manner as in Example 1, provided that the number of moles of $CO_2$ loaded on the aqueous solution during the two cycles when $CaCl_2$ was added instead of $Ca(OH)_2$ was calculated, and results thereof are shown in FIG. 4.

Referring to FIG. 1, it could be confirmed that there was no decrease in the molar amount of carbon dioxide loaded per 1 mol of the amine-based compound added even after repeating 4 cycles. However, in FIG. 4 in which $CaCl_2$ was added instead of $Ca(OH)_2$ which is the basic calcium compound, it could be confirmed that the loading of $CO_2$ relative to the amine-based compound added during the second cycle was remarkably lowered. Thus, it could be confirmed that a large amount of carbon dioxide was loaded by the addition of the basic calcium compound even after repeating the cycles, and thus carbon dioxide could be continuously treated for a long period of time without lowering the treatment efficiency of carbon dioxide in the present invention. Referring to FIG. 2, it could be confirmed from the morphological change of the AMP before and after performing the cycles that the AMP which is the amine-based compound was regenerated by repeating the cycles.

Confirmation of Difference in Loading Speed of Carbon Dioxide

A mineralization speed of carbon dioxide according to each situation was measured for 40 minutes in a case where the same method as in Example 1 was performed, provided that only AMP was dissolved in the aqueous solution (Comparative Example 2), in a case where the same method as in Example 1 was performed, provided that only $Ca(OH)_2$ was dissolved in the aqueous solution (Comparative Example 3), in a case where the same method as in Example 1 was performed, provided that the same amount of $Ca(OH)_2$ as that of AMP was mixed (Comparative Example 4), and in a case where the same method as in Example 1 was performed, provided that 0.5 mol of $CaCl_2$ and 0.5 mol of $Ca(OH)_2$ were mixed per 1 mol of AMP (Example 2). Each $CO_2$ loading speed is shown in Table 1 below.

TABLE 1

| | Comparative Example 2 | Comparative Example 3 | Comparative Example 4 | Example 2 |
|---|---|---|---|---|
| $CO_2$ loading speed | 0.0075 | 0.005 | 0.0059 | 0.0189 |

Referring to Table 1, it could be confirmed that the loading speed of carbon dioxide was remarkably increased when chlorine ions were present in the aqueous solution.

Figure 5:
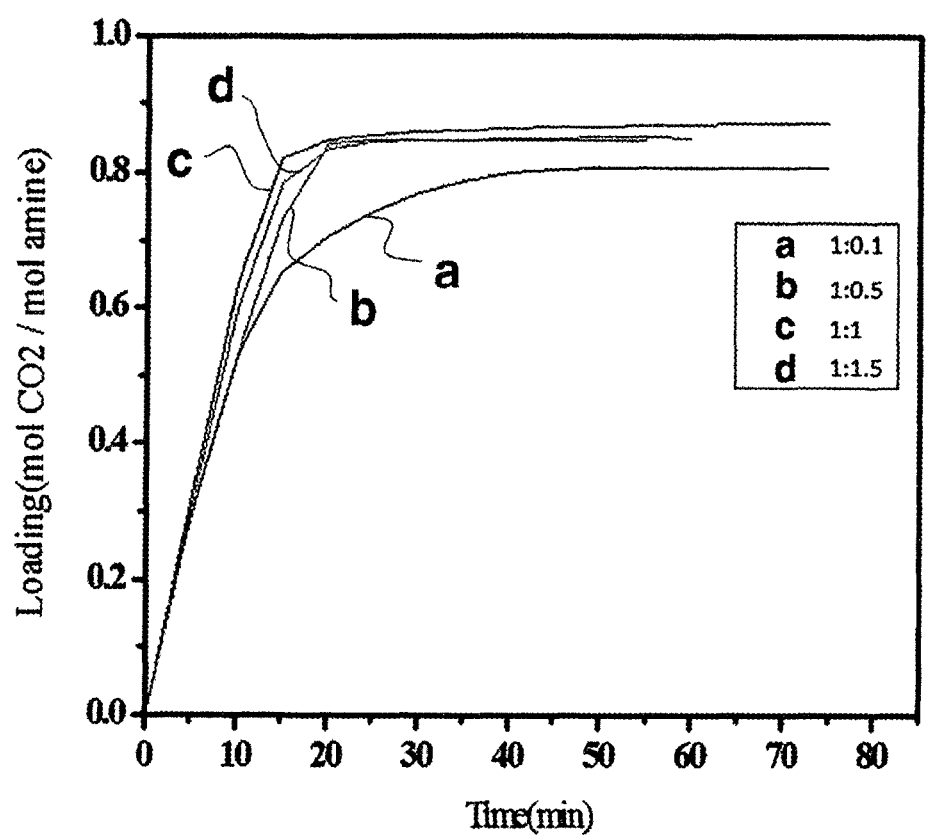
FIG. 5 shows a loading amount of carbon dioxide according to a concentration of dissolved chlorine ions in an embodiment of the present invention.

Comparison of Loading of Carbon Dioxide Depending on Concentration of Acidic Calcium Compound An amount of carbon dioxide to be loaded on the aqueous solution per 1 mol of AMP was measured and only one cycle was measured in a case where the same method as in Example 1 was performed, provided that 0.1 mol of $CaCl_2$ relative to 1 mol of AMP was mixed (Example 3), in a case where the same method as in Example 1 was performed, provided that 0.5 mol of $CaCl_2$ relative to 1 mol of AMP was mixed (Example 4), in a case where the same method as in Example 1 was performed, provided that 1 mol of $CaCl_2$ relative to 1 mol of AMP was mixed (Example 5), and in a case where the same method as in Example 1 was performed, provided that 1.5 mol of $CaCl_2$ relative to 1 mol of AMP was mixed (Example 6), and results thereof are shown in FIG. 5 below. Each amount of carbon dioxide finally loaded on the aqueous solution is shown in Table 2. Here, the gas to be treated was 100% carbon dioxide gas.

TABLE 2

| | Example 3 | Example 4 | Example 5 | Example 6 |
|---|---|---|---|---|
| Amount of final loaded $CO_2$ per 1 mol of AMP | 0.815 | 0.851 | 0.878 | 0.845 |

Referring to FIG. 5 and Table 2, it could be confirmed that the final loading amount varied depending on the addition ratio of chlorine ions, but finally, in all cases, 0.8 mol or more of carbon dioxide relative to 1 mol of the amine-based compound was loaded on the aqueous solution. Further, it could be confirmed that when the molar ratio of AMP and $CaCl_2$ was 1:1, the loading speed of carbon dioxide was the fastest.

The invention claimed is:

1. A method for continuous removal of carbon dioxide comprising:
   a) preparing an aqueous solution containing an amine-based compound and an acidic calcium compound;
   b) bringing a gas containing carbon dioxide to be treated into contact with the aqueous solution to prepare a calcium carbonate precipitate; and
   c) recovering the calcium carbonate and then adding a basic calcium compound to the residual aqueous solution,
   wherein after step c), step b) and step c) are repeatedly performed.

2. The method for continuous removal of carbon dioxide of claim 1, wherein the acidic calcium compound includes chlorine atoms.

3. The method for continuous removal of carbon dioxide of claim 1, wherein the basic calcium compound includes an oxygen atom or a hydroxyl group.

4. The method for continuous removal of carbon dioxide of claim 1, wherein the gas containing carbon dioxide to be treated is an exhaust gas stream.

5. The method for continuous removal of carbon dioxide of claim 1, wherein step b) is performed at room temperature.

6. The method for continuous removal of carbon dioxide of claim 1, wherein carbon dioxide in step b) is dissolved in the aqueous solution in an amount of 0.7 mol or more per 1 mol of the amine-based compound.

7. The method for continuous removal of carbon dioxide of claim 1, wherein in step b), the gas to be treated is brought into contact with the aqueous solution in the form of micro-bubbles.

8. A method for removal of carbon dioxide comprising:
   a) preparing an aqueous solution containing an amine-based compound and an acidic calcium compound;
   b) bringing a gas containing carbon dioxide to be treated into contact with the aqueous solution to prepare a calcium carbonate precipitate; and
   c) recovering the calcium carbonate and then adding a basic calcium compound to the residual aqueous solution,
   wherein after step c), step b) and step c) are repeatedly performed, and
   wherein after step b), the amine-based compound is regenerated at a yield of 95% or more.

9. The method for removal of carbon dioxide of claim 8, wherein a regeneration rate of the amine-based compound is 0.3 $mmol \cdot mol^{-1} \cdot sec^{-1}$ or more.

10. The method for continuous removal of carbon dioxide of claim 1, wherein the amine-based compound is one or more selected from the group consisting of a primary amine, a secondary amine, a tertiary amine, and a sterically hindered amine-based compound.

11. The method for continuous removal of carbon dioxide of claim 1, wherein the calcium carbonate recovered in step c) has an average crystal size of 10 to 50 nm.

* * * * *